United States Patent
Hinderling

(12) 
(10) Patent No.: US 6,504,602 B1
(45) Date of Patent: Jan. 7, 2003

(54) TACHEOMETER TELESCOPE

(75) Inventor: Jürg Hinderling, Marbach (CH)

(73) Assignee: Leica Geosystems AG (CH)

( * ) Notice: Subject to any disclaimer, the term of this patent is extended or adjusted under 35 U.S.C. 154(b) by 61 days.

(21) Appl. No.: 09/645,587

(22) Filed: Aug. 25, 2000

(30) Foreign Application Priority Data

Aug. 31, 1999 (EP) .............................................. 1081459

(51) Int. Cl.⁷ .......................... G01C 3/08; G01B 11/26
(52) U.S. Cl. ..................... 356/5.1; 356/4.01; 356/141.1
(58) Field of Search ...................... 356/4.01, 5.01–5.15, 356/141.1

(56) References Cited

U.S. PATENT DOCUMENTS 6,222,678 B1 * 4/2001 Kimura et al. ............. 356/5.01

FOREIGN PATENT DOCUMENTS

| DE | 2750933 | 5/1978 |
|----|---------|--------|
| DE | 3319610 | 1/1984 |
| DE | 3936966 | 8/1990 |
| WO | 9012284 | 10/1990 |

* cited by examiner

*Primary Examiner*—Stephen C. Buczinski
(74) *Attorney, Agent, or Firm*—Rothwell, Figg, Ernst & Manbeck

(57) ABSTRACT

A tacheometer telescope, i.e. a telescope for a theodolite with integrated distance meter, for optical distance measurement in geodetic, industrial and construction surveying comprises the following:

an optical telescope lens (11);

a motorized theodolite as the telescope support;

an electronic unit for controlling and regulating the motorized theodolite axes;

a distance measuring combination (23) for distance measurement via at least one reflector or at least one target mark to a target object (16) to be surveyed, on the one hand, and to a natural target object (16) without such target marking, on the other hand, with the aid of, in each case, a first (19, 20a) and second sensor means (19, 20b) for at least one beam emitted by a transmission means (S1, S2 or S3); and an evaluation unit (24), connected to the distance measuring combination (23), and at least a third, optoelectronic sensor means (S1, 21, 27) as a processing unit for extensive sensor (27) with angle determination as a further evaluation unit.

18 Claims, 3 Drawing Sheets

TACHEOMETER TELESCOPE

The invention relates to a tacheometer telescope according to the precharacterizing clause of claim 1. Such a telescope system is disclosed in the patent application of the present Applicant, submitted to the German Patent Office on 2.9.1998.

Tacheometers are defined as theodolites with integrated distance meters. For distance measurement, either a reflector is mounted on the target object (cooperative target object) and sighted either manually or with the aid of automatic target recognition or a natural target object without such target marking (noncooperative target object) is sighted manually. In spite of the rapid development of electrooptical distance meters (EDM) during the past twenty years, however, very few tacheometers measuring without reflectors are commercially available today. Where there was a need for these, virtually all apparatuses measuring without reflectors and developed for the geodetics sector were in fact realized as add-on distance meters for technical reasons, such add-on instruments being mounted on the respective theodolites by means of a mechanical or electromechanical adapter.

As a result of the design according to the abovementioned patent application submitted on 2.9.1998, both cooperative and noncooperative target objects can be recognized. It is true that tacheometers having integrated electrooptical distance meters measuring without reflectors are already known per se (ZEISS REC Eita-RL). Such apparatuses are also used both for surveying cooperative target objects and for measuring distances to objects having natural rough surfaces, for example for surveying poorly accessible surfaces, as in quarries, tunnel profiles, road profiles, building facades, etc.

Distance meters measuring without reflectors are as a rule based on the principle of measurement of the transit time of an emitted optical radiation pulse. Compact apparatuses with economical energy consumption always use a pulsed laser diode with a peak output power of about 1 watt to more than 100 watt. In these apparatuses, pulsed infrared semiconductor laser diodes having large emitting surfaces are used as a radiation source. A disadvantage arises from the relatively large dimensions of the emitting surfaces of these lasers, of the order of magnitude of 100 $\mu$m or more. This results in a radiation slope of this apparatus of about 1.5 mrad or more, with the result that a beam cross-section of as much as 15 cm is present at a distance of 100 m. Distances to structures which are smaller than 15 cm therefore cannot be measured. The physical reason for the large beam diameter is that the radiation sources used to date emit non-diffraction-limited radiation. On the other hand, one disadvantage of a radiation beam having a large cross-section is that, in the case of measurements to inclined or structured surfaces of the objects, it is not the true distance which is measured but a distance value intensity-weighted over the irradiated area, and hence the result of the measurement is falsified.

Another disadvantage of electrooptical distance meters measuring without reflectors is that, owing to the infrared or extensive measuring radiation, the object point actually sighted is not detectable. However, in order nevertheless to visualize the target location, it is necessary to use an additional beam, in particular a laser beam, with visible and diffraction-limited emission, whose beam axis must also be adjusted relative to the transmitted beam axis.

In addition to all these difficulties, it is also generally necessary, apart from the distance between the points, also to determine associated angles with geodetic accuracy, and to do so in a distance range from 0.1 m to about 2000 m or more. In general, it is desired to implement surveying tasks as ergonomically as possible. To meet this requirement, it was necessary to date to mark target points with reflection-supported means. Such cooperative target points can be sighted, for example, very rapidly by automatic target recognition (ATR) and surveyed using the conventional infrared distance meter. However, it is not always possible to mount a reflection-supporting means on the target object. Owing to obstacles which cannot be overcome, such as building heights, rivers, lack of authorization for access to plots, etc., certain target objects are not accessible and therefore cannot be marked by reflection means. Consequently, both target points having a natural surface and those which reflect have to be sighted in one and the same surveying task. This was not possible at all using known tacheometers. Apart from the disadvantage of not being able to provide simultaneously in a single instrument all sensors necessary in geodetic surveying tasks, which in any case complicates the surveying task, existing electronic theodolites have the additional deficiency of not complying with the required accuracy of measurement of 1 mm, in particular in distance measurement without reflectors.

A further complicating factor is a desirable miniaturization of a theodolite, i.e. housing a plurality of measuring components in a very small space. This is because even the theodolites equipped with few sensors, in particular theodolite telescopes, which are available at present have relatively large outer dimensions and are therefore heavy, impeding ergonomic use in the field. These are tacheometers with automatic target recognition (ATR) or theodolites having only one EDM measuring to targets without reflectors. In the past, this was certainly one of the reasons why no attempt was made to completely equip a single theodolite, and, where necessary, different measuring tasks were performed using different instruments. It is particularly difficult to miniaturize telescopes of those theodolites which are to have automatic target recognition, since the accuracy of measurement required in geodetic applications is typically 3 to 5 cc (=8 $\mu$rad) or 1 mm point resolution. Such accuracies are achievable only with long focal distances, which, in spite of additional optical components, results in a great constructional length of the optical system. However, shortening may impair the accuracy of angular measurement, in particular if the automatic target recognition is performed by means of a separate, for example biaxial, beam path separated from the visual channel (PCT-SE90-00233).

It is therefore the object of the invention to provide a telescope for an electronic—in particular motorized, preferably with respect to both axes—theodolite, by means of which the geodetic needs can be better covered. In particular, it is the object of the present invention, in addition to a visual telescope and a distance meter measuring only to reflecting target objects, for example an infrared distance meter, to design a diffraction-limited, reflectorless distance meter together with a miniaturized sensor unit for automatic target point recognition and to integrate it in a theodolite telescope.

The telescope equipped with sensors should have as small outer dimensions as possible in order to meet the requirements for convenience during field measurements. Furthermore, the energy consumption should be so low that battery operation is at least possible.

The special challenge of the object according to the invention is in particular to nest four optical channels of 4 independent sensors in one another in such a way that their function individually and in mutual cooperation is ensured. On the one hand, a sensor must operate satisfactorily by itself; on the other hand, the channels may not interfere with one another when functioning simultaneously.

According to the invention, the extension of the object for a telescope according to the precharacterizing clause of claim 1 is possible through the characterizing features of this Claim. This permits not only distance measurement to cooperative and noncooperative target objects but additionally angle determination, in particular cases alternatively with manual or automatic sighting. Thus, natural objects, such as rocks or trees, and buildings, church steeples and other towers can be measured as target objects to be surveyed, as well as targets supported by a reflector, such as a retroprism, reflecting foil, retroreflector or the like. The optical target axis is an excellent direction firstly for the angle measurement relative to the horizontal reference axis, for example in the north direction, and/or relative to the vertical reference axis, for example the vertical axis of the theodolite, which are determined with the aid of separate angle sensors, and secondly for the measurement of the residual angle between target object and target axis, which is performed by means of automatic target recognition with image evaluation and angle calculation. Of course, it may also be possible to use other position-sensitive sensors. However, an advantage of image-generating sensors is the possibility of image documentation.

There is in principle already a large number of applications for a reflectorless method of measurement. Thus, it is sufficiently well known that distances up to 100 m on rough surfaces can be measured without additional marks, such as reflectors or reflective marks. For a required accuracy of measurement of 1 to 3 mm, the divergence of the transmitted beam must be as small as possible since otherwise the distance measurement would not give the required accuracy, owing to the undefined target object illumination. The same applies to the divergence of the received beam. A small divergence reduces the proportion of the simultaneously received ambient light, so that the signal/noise ratio in the receiver is advantageously influenced. On the other hand, a small divergence in a fixed focus arrangement does however have the disadvantage that the overlap of transmitted and received beams is small close up. This is at least alleviated by the coaxial arrangement of transmission and receiving optical systems. To achieve the accuracy of measurement of 1 mm, however, additional technical measures are required, which are to be discussed below.

However, while the classical surveying method in land surveying, building surveying or industrial surveying consists in recording and staking out points with known and unknown coordinates in the object space or on the target object, according to the invention all this is performed using a single instrument. After all, the erection of an instrument (positioning and orienting) takes a certain time, which it is intended to reduce by carrying out all measurements using a single instrument. However, simply the erection and setting up of an instrument according to the invention results in the advantage that, for example when setting up a measuring station with poorly accessible connection points, this task can be performed in one operation by means of reflectorless distance measurement. On the other hand, other points which are marked by prisms or reflective marks can be efficiently measured with the same setup and with the same instrument, and the measurements are performed by means of automatic target recognition, which saves time and additionally increases the accuracy of measurement.

For practical reasons, it is advantageous for the purposes of the invention if the telescope additionally has a visual channel, in particular to an eyepiece, apart from a respective optical transmission and receiving channel. This is because it is not always possible to mark the target point by reflection-enhancing or other means and to sight said target point by automatic target recognition. There are situations where it is possible only with particular effort, if at all, to find the target point automatically. Such target objects without special markings can thus be sighted visually or manually and the distance can then be determined by means of the distance measuring method to a natural target object without target marking, i.e. advantageously using diffraction-limited radiation of, for example, about 30 arc-seconds beam divergence, in particular emitting in the visible wavelength range. Particularly suitable for such reflectorless measurements are applications involving buildings, such as exterior facades or interior rooms. Particularly when used in an interior room, a visible measuring spot has the further advantage that target objects can be sighted directly by means of the visible measuring spot, such as a laser point, without looking through the telescope.

A further advantage of a visible measuring spot arises in the case of motor-controlled profile recordings, in particular of interior rooms. A motorized theodolite is in fact capable of scanning a predetermined profile and recording the corresponding polar coordinates on the measured object with the reflectorless distance meter. However, interruption of the measuring beam between the instrument and the target object by objects or persons is not a rare event. In such a case, a measurement is made to the obstacle which leads to distance measurements falsified in an undesired manner. In the case of the apparatus according to the invention, however, the reflectorless measuring beam is expediently chosen so that it is visible to the naked eye. Sightings to interfering obstacles are therefore immediately visible and can be easily corrected.

A further advantage arises from the cooperation of visible beams, in particular measuring without reflectors, with automatic target recognition. A visible beam, e.g. a laser beam, can in fact also be used as a laser pointer, as already mentioned. In particular, the measuring spot is readily visible to the naked eye even on reflection-supported target objects. Consequently, any error in the automatic target recognition is also easily visible and correctable.

Further details of the invention are evident from the following description of embodiments shown schematically in the drawing.

FIG. 1 shows a perspective view of a tacheometer telescope according to the invention, of which

Figure 1:
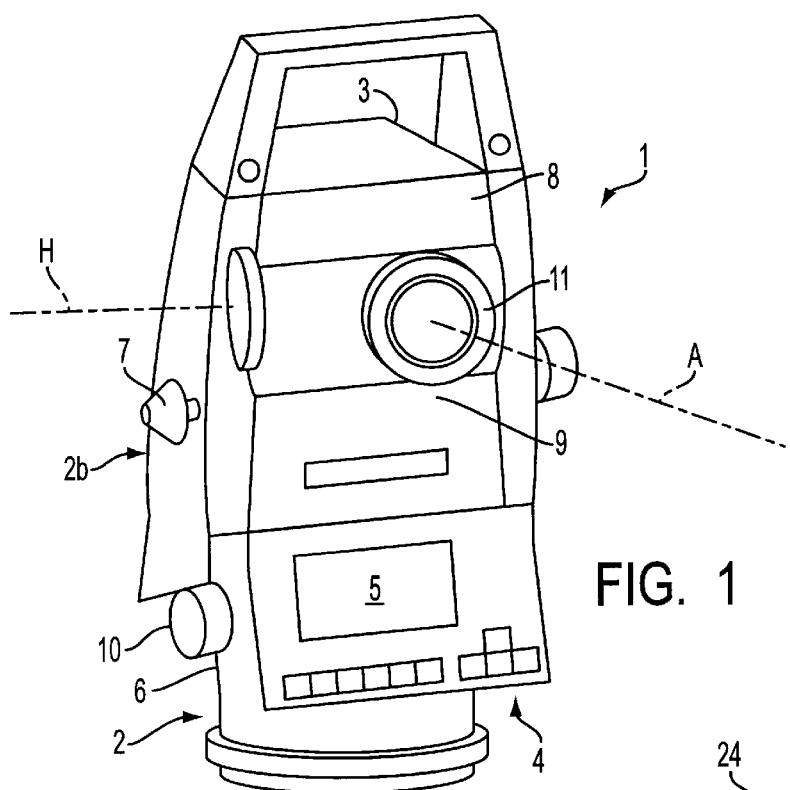

A tacheometer telescope 1 has a theodolite body in a theodolite housing 2 and a telescope housing 3 mounted thereon pivotably in the vertical direction about a horizontal axis H. On the other hand, the theodolite housing 2 is pivotable in the horizontal direction about a vertical axis V. The base part of the instrument is thus the theodolite itself and has a static foot part 2a and an alidade 2b movable about the vertical axis V. The horizontal tilt axis H which carries the telescope housing 3 is fixed to this alidade 2b. The theodolite housing 2 thus serves as a telescope support. Angle sensors (known per se and not shown in FIG. 1, cf. 29 in FIG. 2) for determining the position of the two housings 2, 3 in the horizontal and vertical directions are coordinated with each axis V, H, i.e. for determining the telescope sighting axis or its optical axis A, and an inclination sensor for determining the longitudinal and transverse inclination of the vertical axis V relative to the perpendicular (gravitation vector).

For the purposes of swivelling and for further purposes, a keypad or control unit 4 having a display screen 5 is provided as is a motor unit (cf. 30 in FIG. 2) controllable from this keypad and mounted in the theodolite housing 2 at 6, for the horizontal swivelling, and a motor component provided under a cover 7 for vertical swivelling. The axes V and H are thus coordinated with motors which permit automatic adjustment of the two housings 2 and 3. These components are of key importance for automatic target recognition. Under the cover 7 are also other electronic components, in particular a central processor (the processor 25 discussed below). The central processor controls the time sequences (e.g. serial or parallel) of the measuring processes and swivels the motor-assisted, automated alignment of the instrument with a target object, which alignment is guided by means of a camera described below. In addition, manually controlled swivellability of the housings 2 and 3 about the axes V and H by means of at least one control element 10 can be provided.

This central processor provides a processor board located under a cover 8 in the telescope housing 3 and intended for automatic target recognition, preferably together with a position evaluation unit, or specifically an image processing unit, on the one hand, and a processor board located under a cover 9 in the telescope housing 3 and intended for a distance measurement combination for distance measurement by means of at least one reflector or at least one target mark to a target object to be surveyed, on the one hand, and to a natural target object without such a target mark, on the other hand, with the aid of, in each case, a first and second sensor means, as will be described below. Of course, the various processor components can also be housed in a different manner, but the housing described above has proved expedient.

A front lens 11 or telescope lens of an optical system which is described in detail below with reference to FIGS. 2 to 4 and is or may be a telescope system having at least 20 times magnification, e.g. 30 times magnification, of a type known per se with the advantageous embodiments according to the invention, is present at the front of the telescope housing 3, shown in FIG. 1. The telescope system 11 transmits, for example, a visible wavelength range between blue and red, having a middle wavelength $\lambda_2$. Furthermore, the telescope system 11 transmits wavelengths $\lambda_2$, $\lambda_3$ and $\lambda_4$ of sensor beams which are to be described below and are in the visible and/or near infrared range. Typically, the field of view transmitted by an eyepiece comprises 1.5 degrees. It should be emphasised that this telescope system is common to all transmission and receiving channels.

Figure 2:
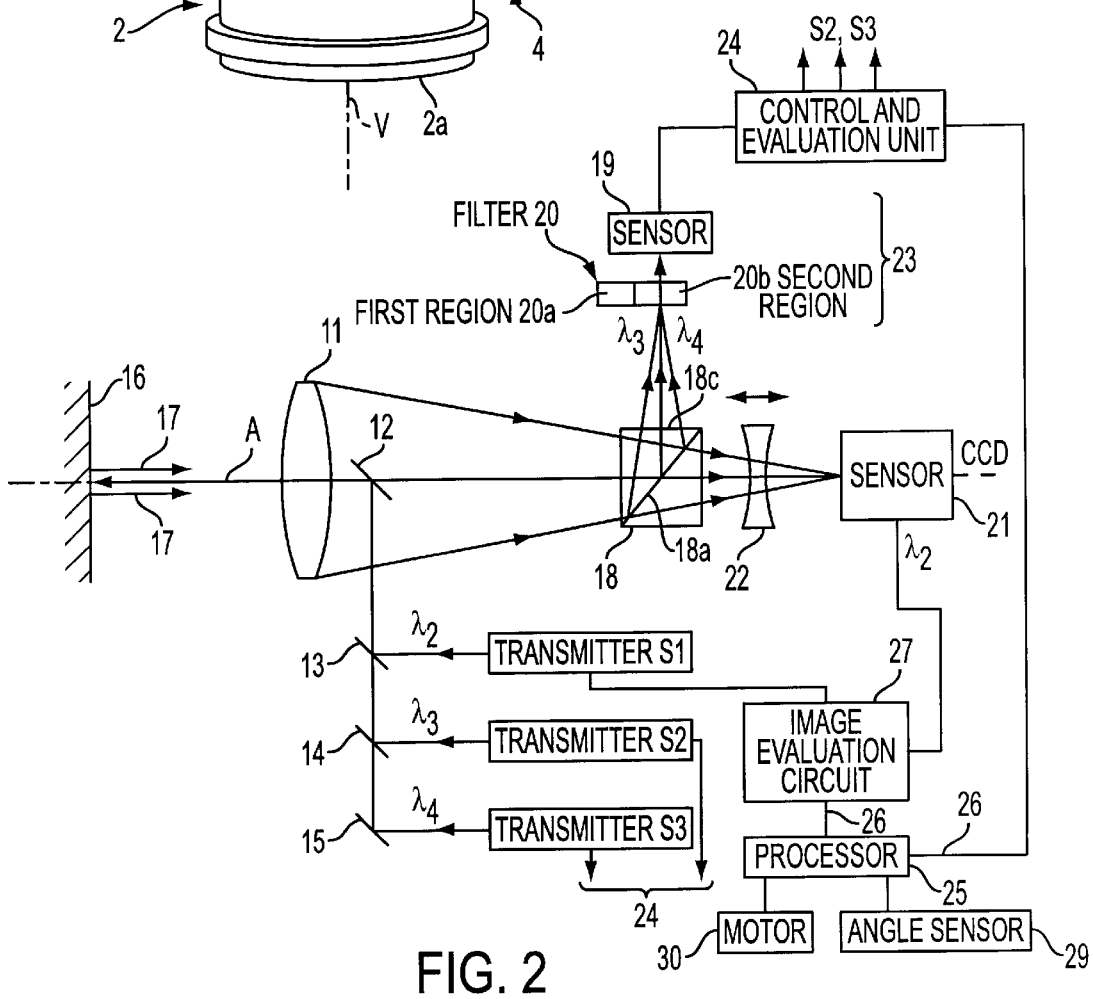
FIG. 2 shows a schematic diagram of a simplified embodiment.

FIG. 2 shows a simplified embodiment of this optical system according to the invention, the telescope lens merely being indicated by the front lens 11. It is particularly advantageous that, in this system, all important optical components are aligned with the common optical axis A. Located on this optical axis A is a relatively small exit mirror or exit prism 12, by means of which the respective beam from three sensors S1, S2 and S3 is deflected in the direction of the optical axis A. It is clear that central shadowing by the mirror 12 located centrally on the axis A must be accepted here, said mirror having a certain effect on the image quality at the position-sensitive sensor 21 explained below. However, the central mirror arrangement 12 ensures that the respective transmitted beams produce a coaxial effect. The position and reflectivity of the mirror 12 are decisive for possible cross-talk from the transmission channel into the receiving channels. The distance between the mirror 12 and the front lens 11 should therefore be as short as possible, and the reflectivity of the mirror surface 12 should be fixed at virtually 100%.

It is preferable if each of the three transmitters S1, S2 and S3, which per se can have any desired radiation sources, in particular light sources (in the widest sense and also including invisible "light"), emits a different and/or spectrally separable wavelength range. Thus, the transmitter S1 outputs a wavelength or a wavelength range $\lambda_2$, the transmitter S2 a wavelength or a wavelength range $\lambda_3$ and the transmitter S3 a wavelength or a wavelength range $\lambda_4$. Advantageously, at least one of these wavelength ranges differs from the ambient light which is visible to the eye and is subsequently denoted by $\lambda_1$ and which as a rule will be the perceptible daylight between 400 and 700 nm, but optionally also a specific floodlight light under which surveying work is carried out. The radiation of each of these three transmitters S1, S2 and S3 has the path shown in FIG. 2, the beams of transmitters S1 and S2, for example, being deflected via semireflecting mirror surfaces 13 and 14 in the direction of the mirror 12, and the radiation of transmitter S3 being deflected via a fully mirrored surface 15. It would of course be possible per se to design the mirror surfaces 13 to 15 and to offset them relative to one another in such a way that each of these mirror surfaces can be fully mirrored without losing the coaxial effect, but the arrangement shown is advantageous for a coincidence of the axes of the transmitters S1 to S3. For example, perforated mirrors or mirrors having angular segments would however also be conceivable.

Another possibility when actuating transmitters S1 to S3 would be to move a single, fully mirrored reflector by a displacement means from the position of the mirror 15 into that of the mirror 14 or of the mirror 13 at time intervals. Combinations are of course also possible, for example if only one fully reflecting mirror is displaceable back and forth between the positions 14 and 15, whereas a semireflecting mirror surface 13 is provided for the transmitter S1. The latter combination is used in particular when, for example, the transmitters S2 and S3 emit radiation at time intervals but the sensor S1 emits radiation simultaneously with one or other or both, but in particular simultaneously with the transmitter S2. This is particularly advantageous for automatic target recognition, as will be explained below.

In a practical example, 2, the wavelength of automatic target recognition, can be, for example, in the infrared or in the visible range and can expediently comprise a predetermined spectrum, $\lambda_4$ is in an infrared range differing from $\lambda_2$, and $\lambda_3$ is in the visible light range but is a low-diffraction beam. It would of course also be possible to provide only a single transmitter and to use this for alternate output of radiation at different wavelength ranges and divergences by interposing appropriate filters or lenses. Lasers which have a plurality of wavelengths and in which the wavelength can be electronically modified are also known today.

By means of the mirror 12, the respective transmitted beam is deflected coaxially along the axis A to a surface 16 of a target object, from where this radiation is reflected back either by means of a mirror or reflector mounted on the surface 16, such as a retroprism, a reflective foil, a retroreflector, target panels having identifying features or the like, to the lens 11, or is reflected back by a natural target object 16 without such target marking. This means that reflected beams 17 enter the lens 11 again coaxially along the axis A.

Beam paths for at least three sensor means are provided behind the mirror 12. These are a receiving sensor 19 which receives a beam via a dividing prism 18 and its mirror surface 18a and for example together with a two-part filter disc 20, is part of a distance measuring combination 23, and an extensive position-sensitive sensor 21, such as a PSD, CCD or CMOS chip or another photo-ASIC. The use of a CCD or CMOS camera unit is preferred. In front of this camera unit is a focusing unit indicated only by a lens 22, for throwing a well defined image of the target object 16 onto the sensor surface 21 of the camera. If sighting or measuring is performed exclusively to cooperative targets, a fixed focus arrangement is also sufficient, and the focusing unit 22 can be omitted. The sensor surface is advantageously sensitive, either through appropriate design of the individual light-sensitive elements or through an interposed optical bandpass filter exclusively for radiation of wavelength $\lambda_2$, only for the radiation emitted by the transmitter S1. The field of view generated together with the lens or the divergence should be in the range between 0.3 and 3 degrees.

The distance measuring combination 23 should serve two purposes, namely on the one hand distance measurement by means of at least one reflector or at least one target mark to a target object to be surveyed and, on the other hand, to a natural target object without such target marking. For this purpose, if it is not intended to use separate sensor means for each type of measurement, the distance measuring combination 23 must be made sensitive exclusively to the wavelength ranges $\lambda_3$ and $\lambda_4$ of the transmitters S2 and S3, which latter transmitters are coordinated with the two above-mentioned types of distance measurement. This can be effected by the filter 20 which allows through only the wavelength $\lambda_3$ in a first region 20a if this region 20a is interposed in front of the sensor 19 or which lets through only the wavelength $\lambda_4$ in a second region 20b if this region 20b is interposed in front of the sensor 19. In a simplified embodiment, the filter 20 is realized as a double bandpass filter with the two transmission regions $\lambda_3$ and $\lambda_4$. A further simplification is achieved by applying a thin optical film having double bandpass characteristics to the surface 18c.

These wavelengths $\lambda_3$, $\lambda_4$ are emitted by the transmitters S2 and S3 expediently in the form of a laser, e.g. laser diode, or LED. In the case of the wavelength $\lambda_4$, the associated transmitter S3 may readily have a relatively large beam divergence, since this part 19, 20b of the distance measurement is intended for reflection-supported target objects. Typically, the field of view or the beam divergence for this distance measurement is 0.1 degree, it being possible for a transmitter and receiver to operate with a fixed focus. For the purposes of the invention, the receiver sensor 19 can be designed very differently, but an avalanche photodiode or a PIN-FET is preferably used.

For the reflectorless distance measurement, the filter region 20a which transmits selectively only for the radiation $\lambda_3$ of the transmitter S2 is inserted in front of the sensor 19. As already mentioned, the transmitter S2 emits a diffraction-limited, visible wavelength range. The effective measuring field (the size of the measuring spot) is then typically only arc-seconds with the beam divergence which is physically the smallest possible in combination with the size of the transmitted-light exit aperture. This small beam divergence makes it possible to measure retroreflecting targets or targets provided with target marks over a distance of several kilometres, e.g. 10 km, whereas the above-mentioned other method of measurement by means of the transmitter S3 is better used for closer targets. Transmitter S2 and receiver 19 can operate with a fixed focus. As is already evident from the above, both modes of operation or sensor combinations 20a, 19 and 20b, 19 can be associated with one and the same control and evaluation unit 24 (which is preferred), although it would also be possible to provide in each case separate evaluation units and also to switch from one evaluation unit to the other by switching the filter 20.

The above-mentioned first evaluation unit 24 (common to both methods of distance measurement)—the above-mentioned processor board for the distance measurement, housed under the cover 9—is connected to the sensor 19 and also controls the transmitters S2 and S3, in order to calculate the distance to the sighted object 16 from the transit time between the output of a transmitted pulse by one of the transmitters S2 or S3 and the reception by the sensor 19. This control and evaluation unit 24 is also connected to the central processor unit 25 mentioned with reference to FIG. 1, via a bus 26 or another type of interface, via which it optionally receives the clock signals of a clock generator provided in the central processor 25. The clock signal is particularly important if the sensors operate simultaneously (in parallel) since in this case the measured data for distance, angle and motor position must be synchronized. The stated theodolite motor units 30 known per se are also controlled via the central processor unit 25, position and angle feedback from angle sensors 29 of the theodolite being sent to the central processor unit 25.

For automatic target recognition (ATR), the sensor S1 and the extensive position-sensitive sensor, preferably an image sensor (CCD), 21 cooperate. The transmitter S1 transmits infrared or visible radiation $\lambda_2$ (e.g. about 800 nm wavelength) and is expediently formed by a laser diode or an LED. The field of view is typically about 1.5 degrees and is thus in a range comparable to that of the visual telescope 11 itself. It is preferable if the fields of view of the automatic target recognition and of the visual telescope are of the same magnitude. This is important not least because any errors in the automatic target recognition (21, 27) can easily be checked and corrected therewith.

Accordingly, a position or, in a specific case, an image evaluation circuit 27 is connected to the extensive sensor 21. The electronic control and evaluation unit 27 includes, inter alia, the functions for image parameter setting, such as shutter time control, target illumination control for the transmitter S1 and fragmentation of the sensor surface, as well as for image acquisition, target object identification, image processing, image evaluation and/or calculation of angles to the target object. The image evaluation circuit (of a type known per se) corresponds to the processor board which, according to the description of FIG. 1, is located under the cover 8. It is advantageously either a microprocessor board or a digital signal processor board (DSP).

During the automatic measuring procedure, the units 27 and 25 cooperate closely: first, a reference input variable for positioning relative to the respective target or finding the target is generated with the control and evaluation unit 27 and taken over by the central control and regulation unit 25. This aligns the motorized theodolite to the target point, and target recognition and analysis and target point measurement (calculation of horizontal and vertical angles) relative to a reference axis, which may advantageously be the axis A, are then carried out. The transmitter S1 can be controlled either by the evaluation unit 27 or directly by the central processor 25. For example, it can also be switched on for a relatively long period while at the same time the transmitters S2 and S3 alternately emit pulsed or modulated light.

Target points which are marked with a reflector or a reflection-supported accessory are surveyed by means of the automatic target recognition thus realized and the distance meter with a large beam. The use of the distance meter with a large measuring field is advisable in particular for two reasons. First, the automatic target recognition system S1, 21, 27 together with the motorized theodolite positioning unit controlled thereby thus need not be accurately aligned with the target object, and the target point can nevertheless be surveyed completely and with the required accuracy. The target recognition system measures the residual angle between target direction A and target point, so that considerable time is saved. Secondly, however, the path of the target point can be automatically recorded or surveyed without troublesome signal breaks, even in the case of moving target objects, since, owing to the large field of view of the sensors involved, the target object cannot readily leave the field of measurement even in the case of jerky movements.

Figure 3:
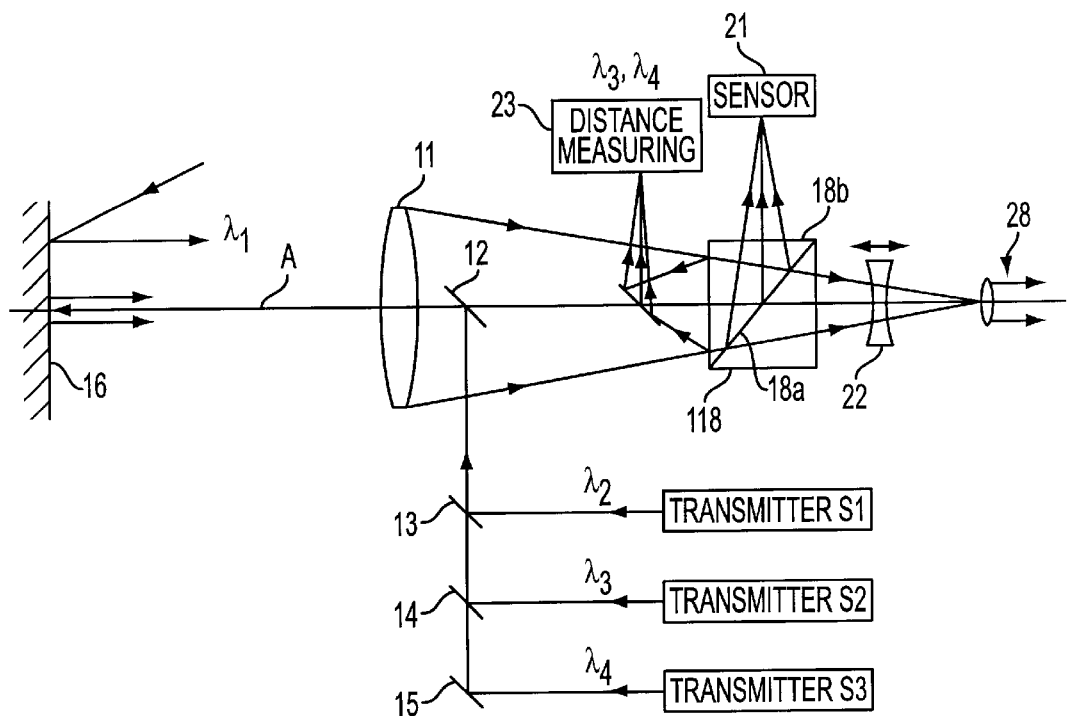
FIGS. 3 and 4 show preferred variants of the embodiment according to FIG. 2.
Figure 4:
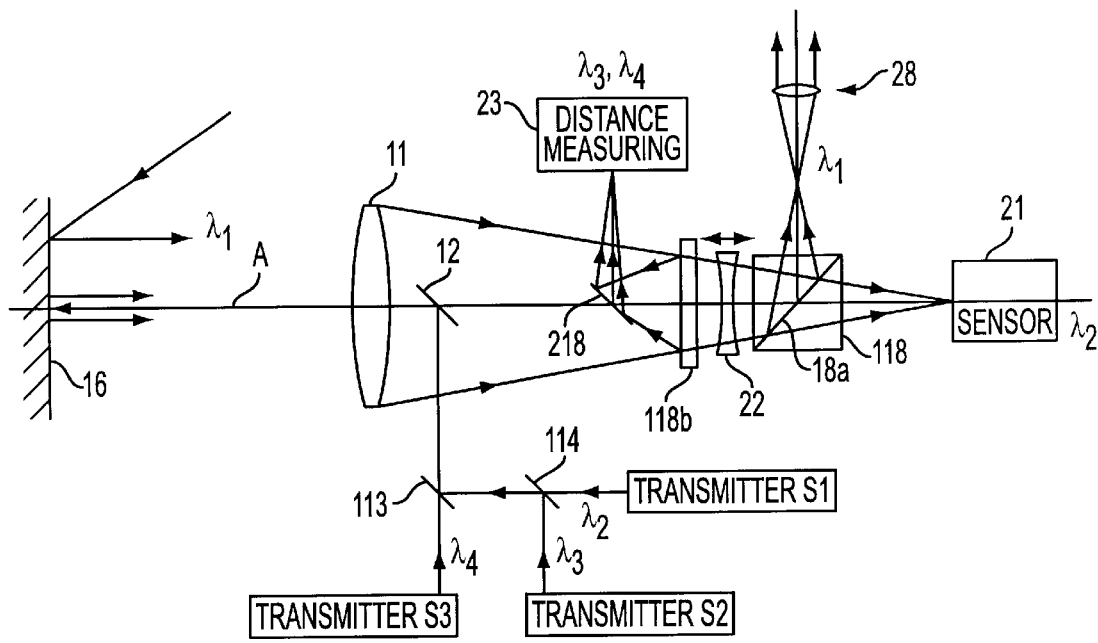

The embodiments according to FIGS. 3 and 4 differ from that of FIG. 2 in particular by virtue of the fact that they permit visual inspection via an additionally provided eyepiece beam path. Parts having the same function therefore have the same reference numerals in these Figures as in FIG. 2. Parts having only a similar function have the same reference numerals with the addition of a hundreds digit.

The difference in FIG. 3 is that the focusing member 22 is in the beam path of an eyepiece 28 to which radiation having a mean wavelength $\lambda_1$ is fed, i.e. of the light incident from the environment on the target object 16, as can be seen. If it is intended to generate a well defined image not only in the visual telescope channel 11, 118, 22, 28 but also on the image sensor 21, it may be expedient to equip the telescope system 11 with a focusing facility in a manner known per se. As a result, the beam path leading to the extensive sensor 21 (whose associated electronic circuit is not shown here and corresponds to that of FIG. 2) is deflected here away from the optical axis A by means of a beam splitter prism 118 which, with its partly mirrored surface 18a, deflects light to the sensor 21. However, this prism 118 also has a front surface 18b which is partly mirrored and throws the incident light onto a small mirror 218 which in turn deflects it to the distance measuring combination 23. It should be mentioned that the mirror surfaces 18a and 18b should be formed as particularly demanding thin films for efficient separation of the wavelengths $\lambda_1$, and $\lambda_2$ on the one hand and $\lambda_3$ and $\lambda_4$ on the other hand. The surface of the mirror 218 is a multisegment optical system, in particular for distance measurement in the near range. The segments have different focal distances, each segment covering an interval of the distance range. In this way, the disadvantage of a small overlap of transmitted beam and received beam, described above, particularly in the case of a small divergence of the transmitter lobe, is eliminated and perfect distance measurement in the near range too is permitted. Measures for eliminating troublesome image overlap in the near range are also possible elsewhere in the beam path but not at components 11 and 118, since these would adversely affect the visual image in the beam path of the eyepiece 28 (if provided).

While the optical arrangement of the transmitters S1 to S3 in FIG. 3 corresponds to that of FIG. 2, FIG. 4 shows how one of the mirrors 13–15 can be dispensed with. Provided here are two semireflecting mirror surfaces 113, 114 which, in the case of mirror surface 114, on the one hand, allows through the wavelength $\lambda_2$ and reflects the wavelength $\lambda_3$ towards the mirror 113, whereas the mirror 113 allows through the wavelength $\lambda_4$ and reflects light of wavelength ranges $\lambda_2$ and $\lambda_3$ upwards towards the mirror 12 on the optical axis A. This can result in a compact design. With regard to possible selectivity of the reflection, the mirror surfaces 113 and/or 114 (incidentally, also the mirror surfaces 13 and 14 of the previous Figures) can be in the form of dichroitic mirrors. However, it must be borne in mind that the coating for the mirrors 13 and 113 is particularly demanding because in fact all three wavelengths $\lambda_2$, $\lambda_3$ and $\lambda_4$ are combined here. Furthermore, for the purposes of the invention, it is entirely possible to provide a common transmitter for at least two wavelengths, similarly to the distance measuring combination 23 on the receiver side, and to carry out switching from one wavelength to the other, for example by means of an optical filter disc or by electrical switching at a laser provided for this purpose and of switchable wavelength, for example by detuning of the effective lattice period of a DBR laser (Bragg laser) or by switching a frequency doubler on and off.

A difference compared with the setup according to FIG. 3 can also be found on the receiver side. Here, the eyepiece is on the output side of the splitting prism 118 and receives light from the semireflecting surface 18a whereas the extensive sensor 21 is on the optical axis A behind the splitting prism 118. However, in order to obtain a well defined image for the eyepiece 28, the focusing lens 22 is positioned in front of the splitting prism, which has the advantage that this focusing is effective both for the eyepiece and for the image sensor 21. However, if it is not desired to use a further splitting prism for selecting the distance-measuring beam path for the distance measuring combination 23 by reflection but, owing to the compact design, it is desired to choose the method of coupling out radiation, as achieved in FIG. 3 by the partly mirrored surface 18b, a partly mirrored plate 118b which performs the same task can be used. It is evident from this that in general the setup according to FIG. 4 is preferable since it permits focusable automatic target recognition in a simple manner.

Figure 5:
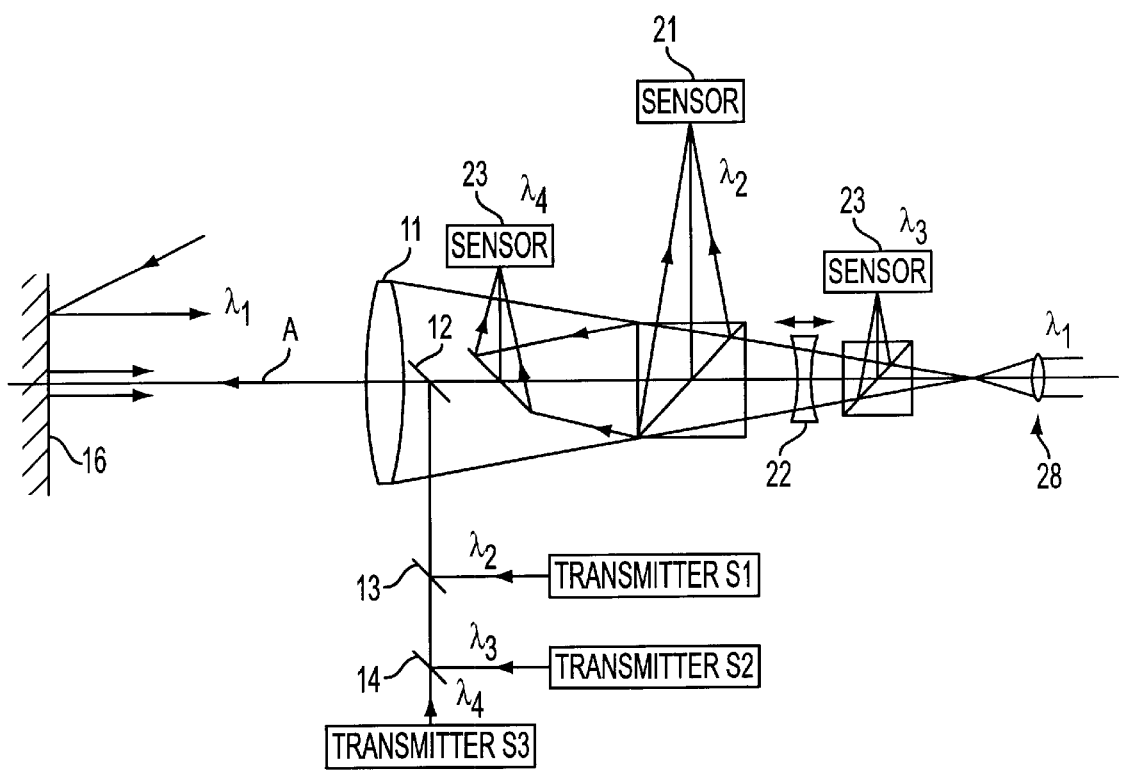
FIG. 5 shows an alternative embodiment with a focusable distance meter unit measuring without reflectors.

FIG. 5 differs from the embodiments described above, such as in particular of FIG. 3, in that separate sensor units 23 are provided in each case to the wavelength $\lambda_3$ and $\lambda_4$, so that a switchable filter can always be dispensed with. The sensor units 23 are then either already tailored to the respective wavelength range by appropriate choice or an optical filter corresponding to the desired wavelength is positioned in front of them in each case. It would of course also be possible for the surfaces reflecting away from axis A to the units 23 to be appropriately wavelength-selective.

For the high required point measurement accuracy of 1 to 3 mm, it is advantageous for all sensors to have a common target axis A, which also forms an excellent reference axis both for all distance and angle sensors in the telescope and for the angle sensors in the theodolite. A common target axis A simplifies the calibration model and the effect of parameters which cannot be measured or are inconvenient to measure, such as inclination of the image object relative to the target axis A. For example, an arrangement having a common target axis is parallax-free, i.e. the raw measured values for the angles are distance-independent. Furthermore, the effect of the target object inclination relative to the line of sight A on angle and distance measurement is small.

What is claimed is:

1. Tacheometer telescope for optical distance measurement in geodetic, industrial and construction surveying, comprising an optical telescope lens (11);

a motorized theodolite as the telescope support;

an electronic unit for controlling and regulating the motorized theodolite axes;

a distance measuring combination (23) for distance measurement via at least one reflector or at least one target mark to a target object (16) to be surveyed, on the one hand, and to a natural target object (16) without such target marking, on the other hand, with the aid of, in each case, a first (19, 20a) and second sensor means (19, 20b) for at least one beam emitted by a transmission means (S1, S2 or S3); and comprising an evaluation unit (24), connected to the distance measuring combination (23), for receiving a signal which corresponds to the respective beam reflected by the target object and for determining the distance from transit time and/or phase position relative to the transmitted signal;

characterized in that in addition at least a third optoelectronic sensor means (S1, 21, 27) for automatic target recognition, having a processing unit for extensive sensors (27) with angle determination, is provided as a further evaluation unit, that the target axes of all these sensor means (29, 20, 23, 21) coincide and form a common effective axis (A), and that the transmitted and the received beams have a coaxial effect relative to the sensor means (29, 20, 23, 21) of the image processing unit (27) and of the distance measuring combination (23).

2. Tacheometer telescope according to claim 1, characterized in that it has a visual channel, in particular to an eyepiece (28), in addition to a respective optical transmission and receiving channel.

3. Tacheometer telescope according to claim 1, characterized in that at least one beam is deflected by a dichroitic splitter (13–15; 18a; 218).

4. Tacheometer telescope according to claim 1, characterized in that at least a part of the sensor means (29, 20, 23, 21) and/or of the transmitters (S1–S3) can be actuated serially via the respective evaluation unit (24, 25, 27).

5. Tacheometer telescope according to claim 1, characterized in that at least a part of the sensor means (10, 20, 23, 21) and/or of the transmitters (S1–S3) can be actuated, and is active, in parallel simultaneously via the respective evaluation unit (24, 25, 27).

6. Tacheometer telescope according to claim 5, characterized in that the transmitter (S1) or sensor (21) for the image or position evaluation can be actuated simultaneously with the transmitter (S2) or sensor (19, 20a) for the distance measurement via at least one reflector or at least one target mark to a target object (16) to be surveyed.

7. Tacheometer telescope according to claim 1, characterized in that it has a telescope housing (3) arranged on a theodolite housing (2), and that at least one of the evaluation units (24, 25, 27) is housed in the latter (3).

8. Tacheometer telescope according to claim 1, characterized in that it has a telescope housing (3) arranged on a theodolite housing (2), and that at least one of the evaluation units (24, 25, 27) is housed in the former (2).

9. Tacheometer telescope according to claim 1, characterized in that the distance measuring combination (23) and/or a transmission means (S1 or S2 or S3) is provided with a means (20a, 20b) for switching from one mode of operation, such as distance measurement via at least one reflector, to another mode of operation, such as distance measurement to a natural target object (16).

10. Tacheometer telescope according to claim 1, characterized in that a multisegment optical system (18b, 18c, 218; 118b) having zones of different focal distances is coordinated with the distance measuring combination (23).

11. Tacheometer telescope according to claim 1, characterized in that at least the evaluation unit (24) connected to the distance measuring combination (23) has a separate evaluation processor.

12. Tacheometer telescope according to claim 1, characterized in that a separate radiation source (S1–S3) is coordinated in each case on the transmitter side with at least two of the sensor means (19, 20, 23, 21).

13. Tacheometer telescope according to claim 1, characterized in that a radiation source (S2) is provided for generating a target point mark.

14. Tacheometer telescope according to claim 1, characterized in that a radiation source is common to at least two of the sensor means on the transmitter side.

15. Tacheometer telescope according to claim 1, characterized in that the distance measuring combination (23) for distance measurement to a natural target object has a transmitter (S2) for generating a diffraction-limited, thin, in particular collimated, beam, preferably in the visible light range.

16. Tacheometer telescope according to claim 13, characterized in that the radiation source (S2) for generating a target point mark by the transmitter (S2) is formed for generating the diffraction-limited thin beam.

17. Tacheometer telescope according to claim 1, characterized in that at least two transmission means (S1–S3) emitting beams are provided, each of which beams is in a different spectral range or wavelength ($\lambda_2$–$\lambda_4$).

18. Tacheometer telescope according to claim 1, characterized in that at least one transmission means (S1–S3) emits a spectrum differing from the ambient light ($\lambda_1$) or from natural daylight visible to the eye, or a different wavelength ($\lambda_2$–$\lambda_4$).

* * * * *